United States Patent [19]

Scott

[11] 4,050,204

[45] Sept. 27, 1977

[54] CONTROLLED DESTRUCTIVE PANEL ASSEMBLY

[75] Inventor: Harley D. Scott, Wexford, Pa.

[73] Assignee: Cyclops Corporation, Pittsburgh, Pa.

[21] Appl. No.: 681,820

[22] Filed: Apr. 30, 1976

[51] Int. Cl.² .............................................. E04B 1/00
[52] U.S. Cl. ........................................ 52/262; 52/547;
       52/93; 52/98; 52/1
[58] Field of Search ........................ 52/98, 1, 478, 547,
       52/506, 488, 732, 625, 580, 629, 571, 90, 262;
       219/117 R

[56] References Cited

U.S. PATENT DOCUMENTS

| 1,365,059 | 1/1921 | Piccirilli | 52/629 |
|---|---|---|---|
| 2,181,074 | 11/1939 | Scott | 52/469 |
| 2,270,218 | 1/1942 | Palmer | 52/469 |
| 2,947,848 | 8/1960 | Sciaky | 219/117 R |
| 2,976,970 | 3/1961 | Toney | 52/732 |
| 3,129,793 | 4/1964 | Ferrell | 52/625 |
| 3,258,887 | 7/1966 | Mostoller | 52/547 |
| 3,332,186 | 7/1967 | Cammaert | 52/90 |
| 3,363,376 | 1/1968 | Wendel et al. | 52/262 |
| 3,885,370 | 5/1975 | Hirvensalo | 52/484 |
| 3,975,882 | 9/1976 | Walter | 52/571 |

Primary Examiner—Ernest R. Purser
Assistant Examiner—Robert C. Farber
Attorney, Agent, or Firm—Webb, Burden, Robinson & Webb

[57] ABSTRACT

A two-span wall panel construction includes a plurality of spaced, horizontal structural girts with liner panels secured between each three adjacent girts. Horizontally extending subgirts are attached to the liner panels and exterior panels are secured to the subgirts. The adjacent, vertical liner panels are positioned in slightly spaced relationship at the end girts and the exterior panels are positioned in overlapping and unattached relationship at the end girts. Clips for holding the liner panels are secured to the end girts between the adjacent liner panels. These clips have angular flanges which pinch the adjacent liner panels against the end structural girts. External forces of predetermined magnitude cause the liner panels to deform about the middle girt as the liner panels pivot about and release from the clip flanges while the overlapping exterior panels simultaneously pivot and release at their overlapping end. An explosion release fastener can be employed to attach the liner panel to the middle girt.

10 Claims, 10 Drawing Figures

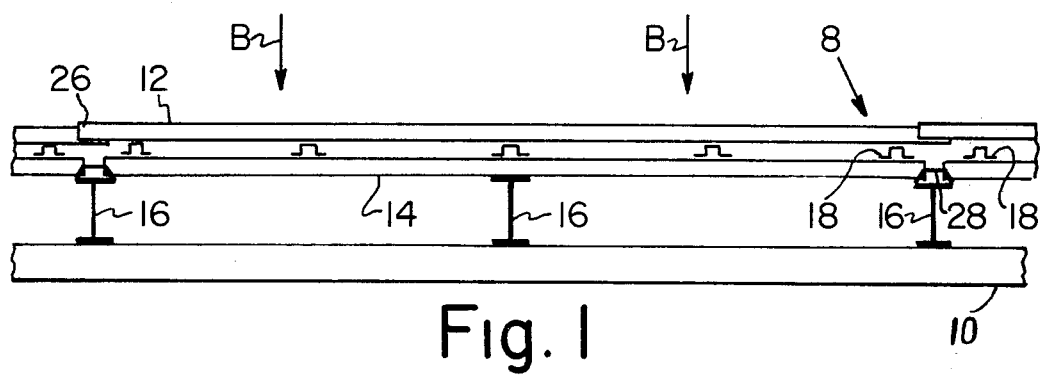
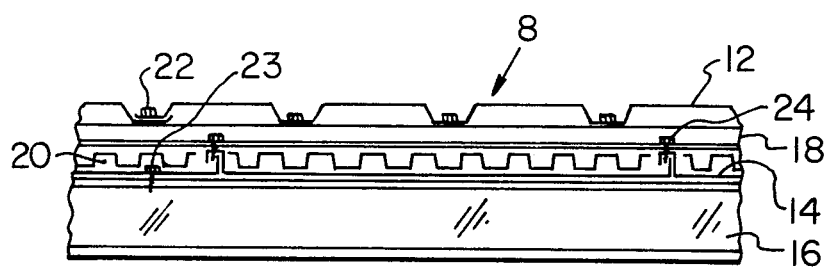
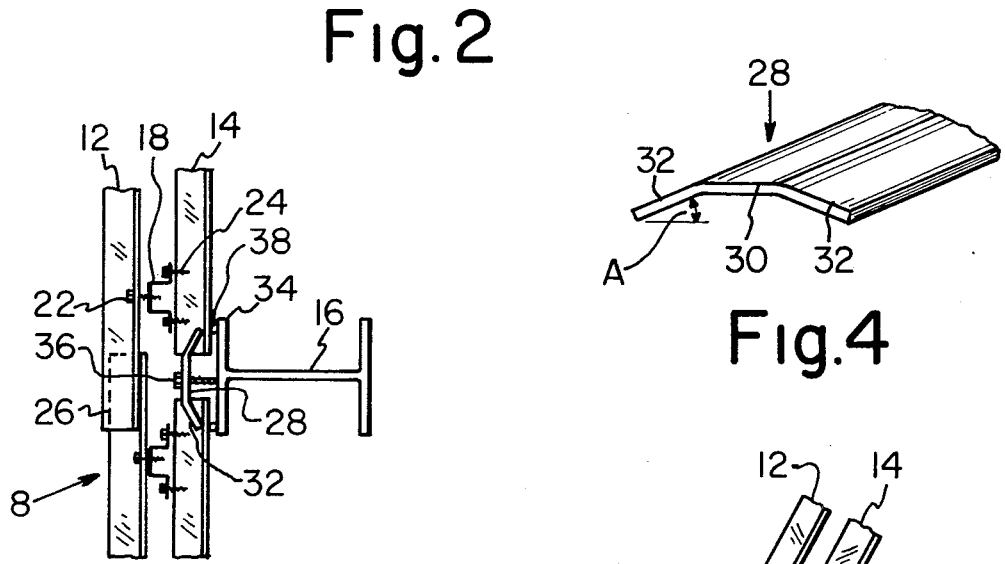
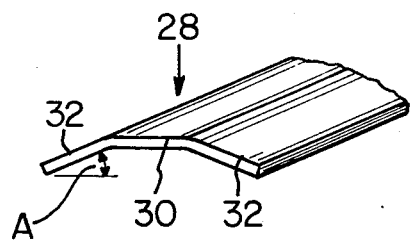
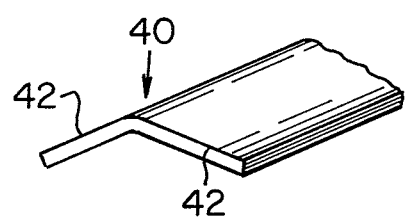
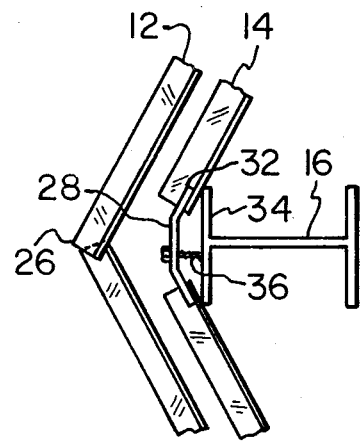

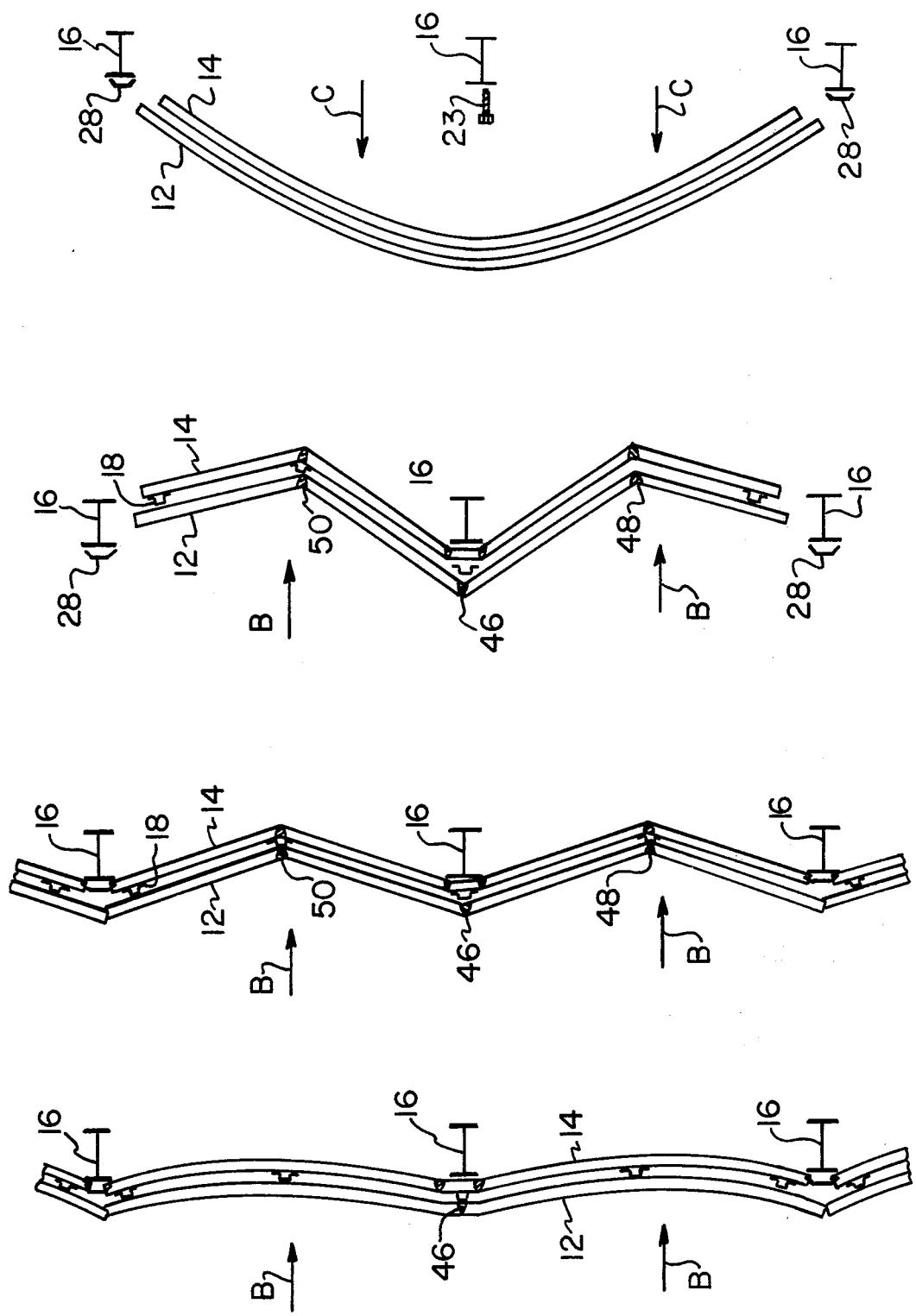

CONTROLLED DESTRUCTIVE PANEL ASSEMBLY

FIELD OF THE INVENTION

My invention relates to wall panel constructions and, more particularly, to a wall panel construction which will destruct when exposed to an external force of a predetermined magnitude such as a tornado or hurricane.

DESCRIPTION OF THE PRIOR ART

Industrial buildings are often constructed of a structural steel framework which is clad with metal wall panels for weather protection. These wall panels include exterior panels, interior liner panels and insulation therebetween. These buildings are designed to withstand loading superimposed by the effects of wind. Certain structures such as electric power plants which may be the equivalent of twenty stories or more must be designed to withstand extraordinary loading of the type created by tornados or hurricanes even though these tornados or hurricanes may only occur on very rare occasions. The structural framework must then be extremely heavy as must be the foundations to withstand these exceptionally high loads.

When a tornado or hurricane hits, loads exceeding 100 pounds per square foot are often imposed on the windward side of the building. At the same time, eddy currents create severe negative forces on the leeward corners of the structure, thereby tending to cause this portion of the building to blow outward rather than inward. Explosions within the building are also a source of outward pressure exerted against the wall panels.

Traditionally, the wall panels in a two-span construction are fastened to the supporting structure with permanent fasteners, bolts, self-tapping screws or the like. These forms of connection result in the theoretical formation of five plastic hinges, one at each of three structural girts and one at each midpoint of the two spans, during failure.

Various forms of explosion relief wall structures have been proposed to solve the problems with internal explosions. Such wall structures are assembled with explosion release fasteners such as that described in U.S. Pat. No. 3,258,887 and others.

SUMMARY OF THE INVENTION

I have developed a wall panel which will release the siding panels at a predetermined load thereby effectively reducing the windload which is carried through the structural framework. Thus, the framework need be designed only to support the predetermined release load, thereby allowing substantial economies in the design of the structural steel framework and the foundations. My design eliminates two of the theoretical plastic hinges, thereby making the destructive load far more predictable. My design can also be combined with an explosion relief wall panel structure so as to provide a blow in and blow out wall panel construction which will destruct when exposed to internal or external forces of a predetermined magnitude.

My wall panel construction includes a plurality of horizontal structural girts secured to vertical structural columns. Limer panels extend between each three girts to form a two-span construction. Horizontal subgirts are secured to the liner panels and exterior panels are connected to the subgirts. Adjacent vertical liner panels terminate in slightly spaced relationship at the end girts and the vertically adjacent exterior panels overlap in unattached relationship. A clip having angular flanges is secured to the end girts between the adjacent space liner panels with the flanges of the clip pinching the adjacent liner panels against the end girts. As failure occurs, the liner and exterior panels release from the end girts and wrap around to the center girt of the three-span construction.

BRIEF DESCRIPTION OF THE DRAWINGS

FIG. 1 is a section through a two-span wall panel construction;

FIG. 2 is a detailed fragmentary section showing a typical wall panel assembly;

FIG. 3 is a fragmentary section showing the end lap connections;

FIG. 4 is a fragmentary isometric of the clip;

FIG. 5 is a fragmentary isometric of another form of clip;

FIG. 6 is a fragmentary section showing the end lap connections during failure;

FIG. 7 is a vertical section through the two-span wall panel at the initial stages of an external destructive load;

FIG. 8 is a vertical section of the two-span wall construction just prior to failure;

FIG. 9 is a vertical section of the two-span wall construction at failure; and

FIG. 10 is a vertical showing the two-span wall construction at failure caused from an internally applied load.

DESCRIPTION OF THE PREFERRED EMBODIMENTS

The steel framework of a large structure such as a power plant or the like includes vertical, structural columns 10 to which the wall panel assembly, generally designated 8, is attached, FIG. 1. Secured to these vertical columns 10 are a plurality of spaced, horizontal structural girts 16. These steel girts 16 are commonly on eight or ten foot centers which then define the span for the wall panel assembly 8. The wall panel assembly 8 is designed to span across two such girt spaces creating what is known as a two-span wall panel construction.

The general arrangement of the wall panel assembly 8 can thus be seen in FIG. 2. The exterior wall panels 12 are attached by means of appropriate fasteners 22 to steel subgirts 18 which extend in parallel relationship to the structural girts 16. The subgirts 18 in turn are secured to the liner panel 14 by means of self-tapping screws 24. The liner panel 14 is fastened to the center structural girt 16 of the three girts which make up the two-span wall panel construction by means of fasteners 23. The liner panel 14 is filled with insulation 20 for thermal control.

The horizontal structural girts 16 actually support the entire wall panel assembly 8, FIGS. 1 and 3. The liner panels 14 are sealed against air leakage by means of a sealant 38 which is applied to the girt 16 before erection of the panels. A heavy gauge clip 28 or pinch plate (e.g. seven to twelve gauge steel plate) serves as the means by which the liner panel 14 is held against the end girts 16 of the two panel span. Adjacent vertical liner panels 14 terminate in spaced relationship along the flanges 34 of the structural end girts 16 of the two-span construction. The clip 28 is secured to the flange 34 by means of a threaded fastener 36.

To facilitate the securing of the clip 28 to the flange 34 of girt 16, clip 28 is constructed with a planar portion 30 through which the fastener 36 extends, FIG. 4. Clip 28 also includes two flanges 32 which each extend outwardly and lie in a plane at an angle from planar surface 30. When the clip 28 is secured in place, the flanges 32 pinch the ends of the respective spaced liner panels 14 against the flange 34 of the structural girt 16. The respective liner panels 14 overlap on the flange 34 a sufficient distance to assure a good clamping contact as the fastener 36 is tightened to pinch the liner panels 14 between the flanges 32 and the girt flange 34.

As stated, the exterior panels 12 are fastened to the subgirts 18 by means of appropriate fasteners such as sheet metal screws 22. The two-span exterior sheets 12 are dimensioned to overlap one another opposite the structural girt 16, FIG. 3. There normally is an overlap of the adjacent exterior panels 12 of about four inches and the respective exterior panels are arranged so that the upper panel laps down over the lower panel, thus allowing rain water to flow over the surface without leaking into the building. The end lap of the subject invention differs from the traditional end lap in that there are no fasteners in the area of the overlap joining the upper and lower exterior panels together. Normally the liner panels 14 would also overlap and a subgirt would be positioned in the area of the overlap opposite a structural girt. Again, as stated, the adjacent vertical liner panels 14 terminate so a space is formed therebetween.

FIGS. 1 and 7-9 show the progression of action as the metal wall panels are subjected to severe inward forces caused by wind load and represented by arrow B. FIG. 1 illustrates the normal position of the wall panel 8 wherein it withstands the ordinary wind loading without any permanent deformation. FIG. 7 shows the manner in which the panels will initially deform when subjected to about two thirds of the design release load. The panel assembly 8 has a severe inward deflection which causes overstressing of both the exterior panel 12 and the liner panel 14. The overstressing creates a distortion of the metal, termed plastic hinge 46, which initially is at the center girt 16. This plastic hinge 46 represents the point at which the respective sheets no longer restore to a normal shape should the load be released.

The effect of this severe inward deflection on the liner and exterior panel ends can be seen in FIG. 6. The liner panels 14 actually pivot about the ends of flanges 32 of the clip 28 as the load is increased. At the same time, the exterior panels 12 merely rotate relative to each other since the overlapping portions are not secured by fasteners.

As the load increases, the bending at the center girt 16 increases and additional plastic hinges 48 and 50 form near the middle of each of the two spans at which time total failure is imminent, FIG. 8. With a standard wall panel construction, an additional set of plastic hinges would form, i.e. at each of the end structural girts 16. However, the ability of the liner panels 14 to pivot about the clip 28 and the ability of the overlapping exterior panels 12 to pivot about each other eliminates this normal set of plastic hinges, thereby making the failure load more predictable and reproducible.

As the deformation continues under load, the exterior and liner panels deflect severely and the liner panels 14 are literally pulled out from between the clip 28 and the flange 34 of the structural girt 16, FIG. 9. In the meantime, the end laps of the exterior panels 12 have rotated and separated also. Once the liner panel 14 is pulled out from the grip of clip 28, it is cantilevered about the center structural girt 16. Continuing wind forces cause the freed ends of the relatively long panel to deform even further and blow out of the way, literally wrapping around the center girt and freeing most of the girt space for the passage of the high volocity winds.

The above actions are for positive or inward pressure on the windward said of a building. At the same time, eddy currents, which create severe negative forces, are created on the leeward corners of the structure. The clips 28 are held in place by fasteners 36 with sufficient force to resist the outward forces due to the negative loading. By connecting the center of the liner panel 14 to the center structural girt 16 with an explosion release fastener such as that illustrated in U.S. Pat. No. 3,258,887, the negative forces on the leeward corners of the structure are provided for. The explosion fasteners 23 are designed to release at a lower load than the resistance of the clip 28 to the negative wind loading. As a result, when the predetermined release force has been reached, the explosion release fasteners with deliberately fail in tension causing the center of the liner panel to blow out away from the center girt thereby making the two shorter spans into one long span, FIG. 10. Since the span is now doubled, the panels have insufficient strength to resist the existing wind or explosion forces and the ends will slip out from between the clip 28 and the girt 16 causing a complete release and thus freeing the girt spaces allowing the high velocity winds to move freely through the structure as previously described. Panel cable retention devices are known which can be utilized to prevent the loosened panels from becoming dangerous flying objects.

It is also possible to use ordinary, self-tapping screws with washers to secure the liner panel to the center girt. Again, under a predetermined load, failure of the panels occurs as the sheet metal liner deforms over the fastener head and ultimately pulls over the fastener head to create the same action as previously described.

With regard to the clip 28, it has been found that an included angle of 10°, designated A in FIG. 4, provides on the one hand an adequate clamping force to hold the liner against the structural girt, and on the other hand permits free rotation therearound during failure. An alternate clip 40 is illustrated in FIG. 5 wherein the flanges 42 merely come together along the bend line, thereby eliminating the planar surface of the previous embodiment. The main disadvantage of the embodiment of FIG. 5 is that it is more difficult to fasten the clip 40 to the flange of the structural girt because of the sloping surfaces.

Normally, the exterior panels for such constructions are designed for the greatest strength with the panel profiles usually having rather narrow, flat surfaces in order to resist buckling. This criteria need not be employed with my design and the panels normally will be designed to have relatively broad, flat exterior surfaces which will deliberately allow the panels to buckle at the predetermined load, thus allowing the plastic hinges to form and the panels to follow the deformation pattern previously described. The main structure and foundation need only withstand the designed failure load, for example, 60 pounds per square foot, since at hurricane or tornado wind loads, the panels will release and permit the winds to pass through the girt spaces without destroying the basic structure or foundation. And on the rare occasion when a tornado or hurricane strikes, the panels are considered expendable and can be replaced at substantially lower costs than that of originally building a greatly over-designed structure and foundation.

I claim:

1. A wall panel construction comprising:
   A. a plurality of spaced, horizontal structural girts secured to vertical, structural columns;
   B. liner panels extending between each three girts with vertically adjacent panels terminating at end girts of the three in slightly spaced relationship;
   C. a plurality of spaced, horizontal subgirts secured to the liner panels with certain of the subgirts positioned on either side of the end girts;
   D. exterior panels extending between each of said three girts and connected to the subgirts with vertically adjacent panels overlapping in unattached relationship;
   E. a clip having angular flanges and secured to said end girts between the adjacent spaced liner panels, the flanges of said clip pinching the adjacent liner panels against the end girts;
   F. means to attach the liner panels to a middle girt of the three girts;

whereby an external force of predetermined magnitude against the wall panel construction causes the adjacent liner panels to deform about the middle girt as the liner panels pivot about and release from the clip flanges while simultaneously the overlapping, exterior panels pivot and release at their overlapping ends.

2. The wall panel construction of claim 1 wherein the attaching means comprises an explosion release fastener with a release strength from an internally applied force less than the holding strength of the clip.

3. The wall panel construction of claim 1 wherein the attaching means comprises a self-tapping fastener.

4. The wall panel construction of claim 1, said clip having a planar surface connecting the angular flanges.

5. The wall panel construction of claim 4, said clip 4, said clip secured to said end girts by a fastener extending through said planar surface.

6. The wall panel construction of claim 1, said angular flanges of said clip forming an included angle of approximately 10° with said end girts.

7. The wall panel construction of claim 1, the angular flanges of said clip joining each other at a bend line.

8. The wall panel construction of claim 1, including insulation positioned between the liner panel and the exterior panel.

9. The wall panel construction of claim 1, said exterior panels including broad, flat, exposed surfaces to precipitate failure at the predictable load.

10. In a two-span wall panel construction, including a plurality of spaced, horizontal girts, liner panels secured between each two end girts and a center girt, a plurality of spaced subgirts secured to the liner panels and exterior panels extending between said three girts, the improvement comprising:

adjacent vertical liner panels positioned in slightly spaced relationship at the end girts, vertically exterior panels positioned in overlapping and unattached relationship at the end grits and clips having angular flanges secured to the end girts between adjacent spaced liner panels, said flanges pinching the adjacent liner panels against the end girts.

* * * * *

UNITED STATES PATENT AND TRADEMARK OFFICE
CERTIFICATE OF CORRECTION

PATENT NO. : 4,050,204

DATED : September 27, 1977

INVENTOR(S) : Harley D. Scott

It is certified that error appears in the above-identified patent and that said Letters Patent are hereby corrected as shown below:

Column 1 Line 49 After "panel" insert --system--.
Column 1 Line 65 "Limer" should read --Liner--.
Column 2 Line 29 After "vertical" insert --section--.
Column 3 Line 33 "arrow" should read --arrows--.
Column 4 Line 8 "volocity" should read --velocity--.
Column 4 Line 10 "said" should read --side--.
Column 4 Line 23 "with" should read --will--.

In the Claims:

Claim 5 - Column 6 Line 7 Delete --said clip 4, --.
Claim 10 - Column 6 Line 30 "grits" should read --girts--.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*